United States Patent
Palmer et al.

(10) Patent No.: US 8,641,135 B2
(45) Date of Patent: Feb. 4, 2014

(54) SILL PANEL

(75) Inventors: Eberhard Palmer, Vaihingen/Enz (DE); Heinz-Arno Kruschhausen, Wiernsheim (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 151 days.

(21) Appl. No.: 12/910,968

(22) Filed: Oct. 25, 2010

(65) Prior Publication Data

US 2011/0140482 A1 Jun. 16, 2011

(30) Foreign Application Priority Data

Dec. 16, 2009 (DE) .......................... 10 2009 058 504

(51) Int. Cl.
*B60R 13/04* (2006.01)

(52) U.S. Cl.
USPC .......................................................... 296/209

(58) Field of Classification Search
USPC .................... 296/1.08, 146.7, 209, 901.01
See application file for complete search history.

(56) References Cited

U.S. PATENT DOCUMENTS

| | | | | |
|---|---|---|---|---|
| 2,494,659 A | * | 1/1950 | Huyton | 285/41 |
| 3,140,891 A | * | 7/1964 | Shreffler | 296/1.08 |
| 3,495,673 A | * | 2/1970 | Yazejian | 180/89.2 |
| 3,580,628 A | * | 5/1971 | Rantala | 296/209 |
| 4,348,849 A | * | 9/1982 | Wollam et al. | 52/545 |
| 4,607,878 A | * | 8/1986 | Itoh | 296/199 |
| 5,139,848 A | * | 8/1992 | Grafen et al. | 428/138 |
| 5,228,742 A | * | 7/1993 | Johnson et al. | 296/191 |
| 5,465,486 A | * | 11/1995 | King | 29/897.32 |
| D379,956 S | * | 6/1997 | Baughman | D12/181 |
| 6,030,030 A | * | 2/2000 | Riddle et al. | 296/209 |
| 6,102,473 A | * | 8/2000 | Steininger et al. | 296/209 |
| 6,139,089 A | * | 10/2000 | Troyer | 296/180.1 |
| 6,276,109 B1 | | 8/2001 | Hingorani et al. | |
| 6,325,451 B1 | * | 12/2001 | Sikorski | 296/204 |
| 6,641,191 B1 | * | 11/2003 | Berger et al. | 296/29 |
| 6,811,210 B2 | * | 11/2004 | Granger et al. | 296/29 |
| 6,948,753 B2 | * | 9/2005 | Yoshida et al. | 296/1.08 |
| 7,144,075 B2 | * | 12/2006 | Shishikura | 296/209 |
| 7,556,852 B2 | * | 7/2009 | Aoki et al. | 428/172 |
| 7,665,795 B2 | * | 2/2010 | Shishikura | 296/180.1 |
| 8,083,285 B2 | * | 12/2011 | Yanagida et al. | 296/181.5 |

(Continued)

FOREIGN PATENT DOCUMENTS

DE 101 57 740 A1 7/2003
DE 102 15 707 A1 11/2003

(Continued)

OTHER PUBLICATIONS

German Patent and Trademark Office Search Report, Dated Aug. 20, 2010.

*Primary Examiner* — Glenn Dayoan
*Assistant Examiner* — Paul Chenevert
(74) *Attorney, Agent, or Firm* — Gerald E. Hespos; Michael J. Porco; Matthew T. Hespos

(57) ABSTRACT

A sill panel made of plastic extends in the longitudinal direction of the vehicle and is connected to the vehicle body. The sill panel is of an arched configuration and has an upper, upright fastening flange, which is connected to the vehicle body by fastening devices. Vertically oriented, upwardly open slots are provided in the fastening flange, between the fastening devices.

13 Claims, 2 Drawing Sheets

(56) References Cited

U.S. PATENT DOCUMENTS

| | | |
|---|---|---|
| 8,205,453 B2 * | 6/2012 | Conete ............................ 60/752 |
| 8,262,154 B2 * | 9/2012 | Garnett et al. ................. 296/199 |
| 8,328,453 B2 * | 12/2012 | Keith et al. ..................... 403/30 |
| 2005/0241259 A1 | 11/2005 | Rijsbergen et al. |
| 2007/0182201 A1 * | 8/2007 | Gilleo et al. ............... 296/146.7 |
| 2009/0167010 A1 * | 7/2009 | Rompage et al. ............ 280/847 |
| 2011/0127797 A1 * | 6/2011 | Garnett et al. ............. 296/146.5 |

FOREIGN PATENT DOCUMENTS

| | | | |
|---|---|---|---|
| EP | 1 375 255 A2 | 1/2004 | |
| EP | 1 591 319 B1 | 4/2009 | |
| JP | 02041986 A * | 2/1990 | ............ B62D 25/18 |

* cited by examiner

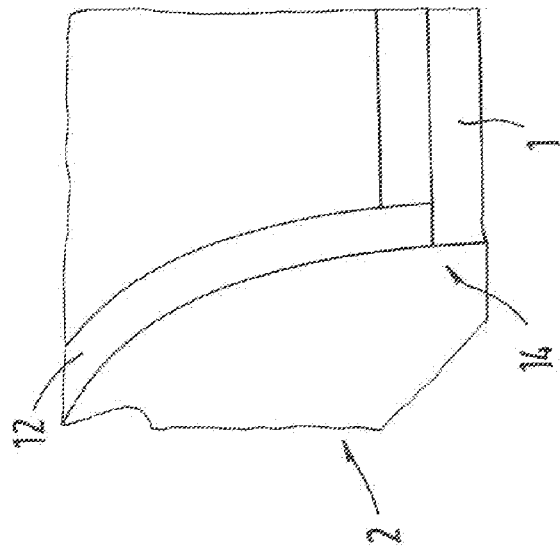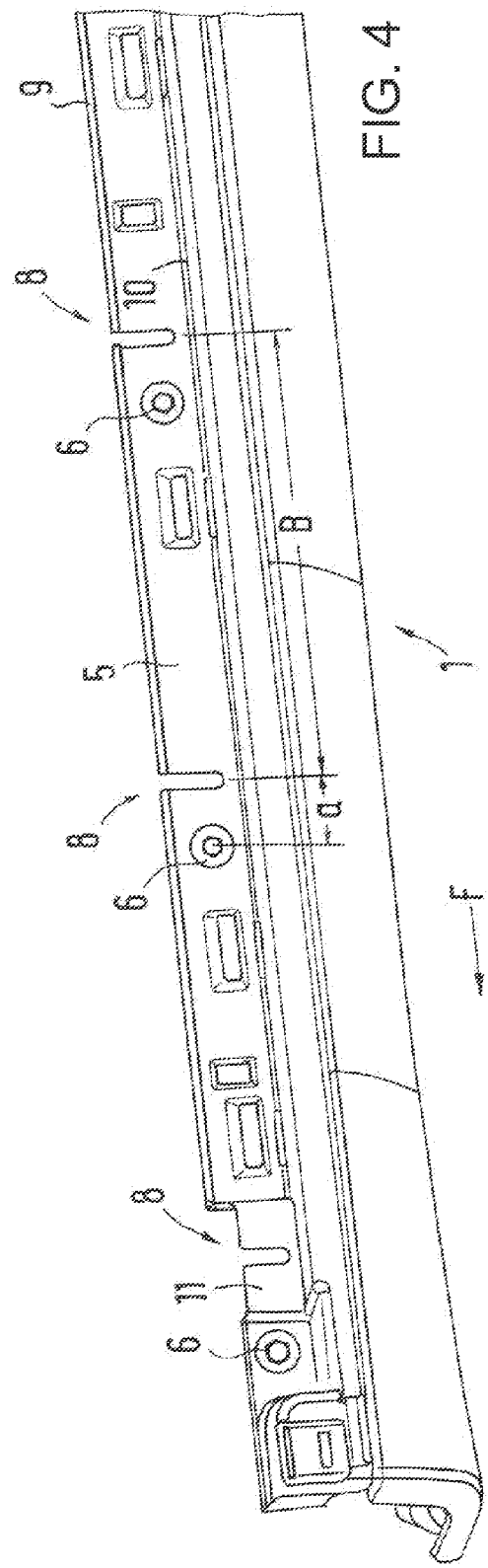

SILL PANEL

CROSS-REFERENCE TO RELATED APPLICATION

This application claims the priority, under 35 U.S.C. §119, of German application DE 10 2009 058 504.4, filed Dec. 16, 2009; the prior application is herewith incorporated by reference in its entirety.

BACKGROUND OF THE INVENTION

Field of the Invention

The invention relates to a sill panel made of plastic for a motor vehicle, which extends in the longitudinal direction of the vehicle between front and rear wheel cutouts and can be fastened to the metallic vehicle body by fastening devices.

Published, non-prosecuted German patent application DE 102 15 707 A1 discloses a panel component made of plastic as an interior panel, exterior panel or attachment for motor vehicles, which has at least one zone in the form of a corrugated profile that compensates for tolerances.

SUMMARY OF THE INVENTION

It is an object of the invention to provide a sill panel that compensates for changes in length due to the effect of heat or cold and prevents visible changes in shape at the sill panel.

With the foregoing and other objects in view there is provided, in accordance with the invention a sill panel assembly for a motor vehicle. The sill panel assembly containing a sill panel made of plastic, having fastening devices, and extending in a longitudinal direction of the motor vehicle between front and rear wheel cutouts and fastenable to a metallic vehicle body by the fastening devices. The sill panel is configured with an arched lower portion and an upper, offset and upright fastening flange connected to the metallic vehicle body at corresponding fastening points by the fastening devices. The fastening flange has vertically oriented and upwardly open slots and in each case at least one of the slots is disposed between individual ones of the fastening devices.

The principal advantages achieved by the invention are that the changes in length at the plastic sill panel caused by the effects of heat or cold are accomplished by compensation of its length, and that deformation of the sill panel is avoided. According to the invention, this is achieved in an advantageous manner by virtue of the fact that the sill panel, which is configured with an arched lower portion, contains an upper, upright fastening flange, which can be connected to the vehicle body by fastening devices, and that a vertically oriented, upwardly open slot is in each case is provided at least between the individual fastening devices of the fastening flange.

In particular, the slots extend almost as far as the bottom of the fastening flange between the fastening devices and are rounded at the end. The slots are uniformly spaced with respect to one another and are each arranged immediately adjacent to the fastening devices. By this configuration and arrangement of the individual slots in the fastening flange, the stresses which arise between the fastening points due to the effects of temperature can be prevented in an effective manner by the slots, ensuring that the component remains true to shape even after undergoing a large number of temperature cycles and that, for example, waviness in the visible area is prevented. In addition, the aim is to achieve a transition which is as uniform as possible between the sill panel and the wheel arch.

Provision is furthermore made, according to the invention, for the slots arranged at the ends of the sill panel each to be arranged in a shaped feature of u-shaped cross section on the fastening flange. The slots can also be arranged in integrally formed features which deviate from the fastening flange, thereby ensuring that the effectiveness of the length changes due to the effect of heat and cold are not hindered.

In particular, the slots in the fastening flange can each be provided—as seen in relation to the direction of travel—immediately ahead of and at a small spacing from the fastening devices, the slots forming between them in each case mutually corresponding zones to compensate for the changes in length due to a high or low temperature effect. These mutually corresponding zones in the fastening flange of the sill panel, which each enclose a fastening point, allow uniform compensation of the change in length over the entire length of the panel.

It is, of course, possible, according to the invention, for a plurality of mutually spaced vertical slots to be arranged in each case between the fastening devices or points. In particular, the slots extend parallel to one another and are arranged at a right angle to the free upper edge of the fastening flange. According to the invention, this ensures that the stresses in the component can be dissipated to the vehicle body between each fastening point of the sill panel, thereby ensuring that the panel makes an optimum visual impression externally.

Other features which are considered as characteristic for the invention are set forth in the appended claims.

Although the invention is illustrated and described herein as embodied in a sill panel, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 3 is an illustration showing a view of the end of the sill panel adjoining a wheel arch; and FIG. 4 is a perspective view of an enlarged representation of part of the sill panel.

DETAILED DESCRIPTION OF THE INVENTION

Figure 1:
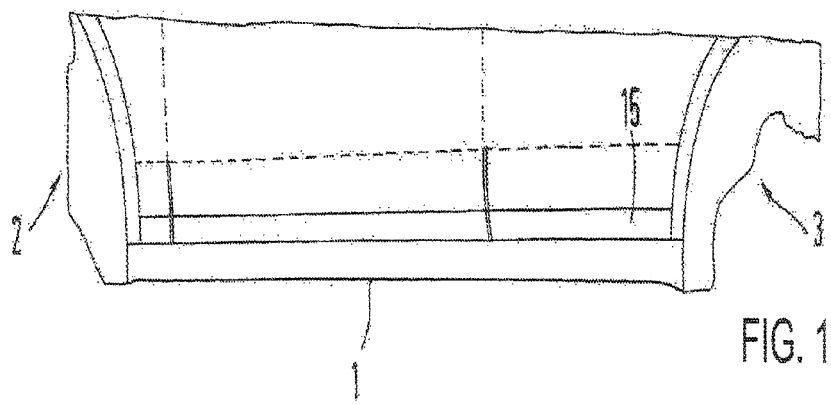
FIG. 1 is an illustration showing a view of a sill panel installed in a vehicle, as seen from the outside, according to the invention.
Figure 2:
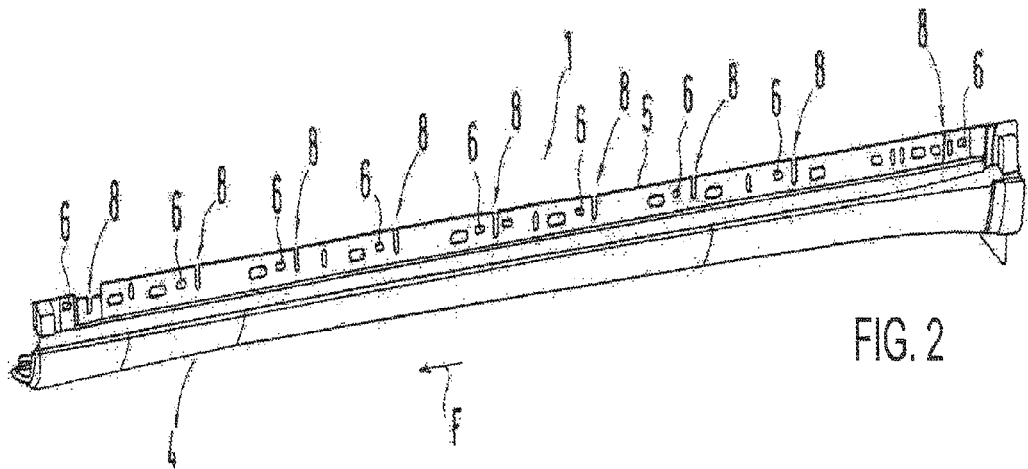
FIG. 2 is a diagrammatic, perspective view of the sill panel with slots arranged in a fastening flange of the sill panel.

Referring now to the figures of the drawing in detail and first, particularly, to FIG. 1 thereof, there is shown a sill panel 1 for a motor vehicle that is composed of a plastic and extends in the longitudinal direction of the vehicle between two wheel cutouts 2, 3. The panel 1 has a lower portion 4, which is curved in an arc shape, adjoining which at the top is an angled, vertically oriented fastening flange 5.

The fastening flange 5 is connected securely to a metallic vehicle body 15 at fastening points by fastening devices 6.

Arranged between each of the fastening points of the fastening devices 6 there are vertically oriented slots 8. The slots 8 each extend parallel to one another and are arranged at a right angle to a free upper edge 9 of the fastening flange 5.

The slots 8 extend approximately as far as a bottom 10 of the fastening flange 5 between the fastening devices 6 and are open at the top and rounded at an end.

As can be seen, in particular, from FIG. 4, the slots 8 are each provided immediately adjacent to the fastening devices 6 and to the fastening points on the vehicle body 15, with a small spacing a.

As seen in relation to a direction F of travel of the vehicle, the slots 8 are each arranged ahead behind the fastening devices 6 or points. According to another embodiment, it is also possible for a plurality of slots 8 to be provided ahead of the fastening devices 6, depending on requirements.

Mutually corresponding zones B for compensating changes in length due to a temperature effect are in each case formed between the individual slots 8. This compensation has the effect of preventing any stresses which occur between the fastening devices 6 and hence eliminating visible deformations of the sill panel 1 from the outset.

At the free end of the sill panel 1, the slots 8 are each arranged in a model-dependent integrally formed feature 11, the feature being given the cross section of a u-profile.

As is shown in detail in FIG. 3, the free end of the sill panel 1 is arranged adjoining and below one end of a wheel arch 12. Avoiding changes in the length of the sill cover 1 ensures that there is a uniform transition 14 from the wheel arch to the panel 1.

The invention claimed is:

1. A sill panel assembly for a motor vehicle, comprising: a sill panel made of plastic and extending in a longitudinal direction of the motor vehicle between front and rear wheel cutouts and fastening devices at a plurality of positions spaced apart along the longitudinal direction for fastening the sill panel to a metallic vehicle body of the motor vehicle, said sill panel being configured with an arched lower portion and an upper fastening flange extending up from the arched lower portion and offset from the arched lower portion, each of the arched lower portion and the upper fastening flange extending substantially from the front wheel cutout to the rear wheel cutout, the upper fastening flange being connected to the metallic vehicle body at corresponding fastening points by said fastening devices, said fastening flange having vertically oriented and upwardly open slots formed therein and in each case at least one of said slots is disposed between individual ones of said fastening devices, opposite longitudinal ends of the sill panel being formed respectively with shaped features having an outer panel offset outward of the metallic vehicle body and connecting panels extending toward the metallic vehicle body for defining U-shaped cross sections on said fastening flange, each of the shaped features having one of the vertically oriented and upwardly open slots formed therein, one of the fastening devices being on each longitudinal side of each of the shaped features.

2. The sill panel assembly according to claim 1, wherein said slots extend almost as far as a bottom of said fastening flange between said fastening devices and have rounded lower ends.

3. The sill panel assembly according to claim 1, wherein said slots are uniformly spaced with respect to one another and are each disposed immediately adjacent to one of said fastening devices and farther from all of the other fastening devices.

4. The sill panel assembly according to claim 1, wherein the slots in said fastening flange are each provided respectively immediately behind the fastening devices with respect to a forward direction of travel and at a spacing from said fastening devices.

5. The sill panel assembly according to claim 1, wherein said slots form between them in each case mutually corresponding zones to compensate for changes in length due to a high or low temperature effect.

6. The sill panel assembly according to claim 1, wherein each of said slots is disposed between two of said fastening devices.

7. The sill panel assembly according to claim 1, wherein: said fastening flange has a free upper edge; and said slots extend parallel to one another and extend at a right angle into said free upper edge of said fastening flange.

8. An elongated sill panel for a motor vehicle that has a metallic vehicle body, the elongated sill panel being formed from plastic and having a direction of elongation extending in a traveling direction of the motor vehicle between front and rear wheel cutouts, comprising:
an elongated arched lower portion extending in the traveling direction of the motor vehicle from the front wheel cutout to the rear wheel cutout;
an elongated upright fastening flange extending up from an upper side of the arched lower portion and joined continuously to the upper side of the arched lower portion from the front wheel cutout to the rear wheel cutout, the fastening flange further having a free upper edge on a longitudinal side of the fastening flange opposite the arched lower portion;
a plurality fastening devices provided on the fastening flange at positions spaced apart along the traveling direction of the motor vehicle for fastening the sill panel to the metallic vehicle body of the motor vehicle;
slots disposed between the fastening devices and extending from the free upper edge of the fastening flange to positions in proximity to the arched lower portion of the elongated sill panel, the slots being dimensioned and disposed to compensate for temperature related dimensional changes and corresponding stresses that could cause visible deformation of the sill panel; and
opposite longitudinal ends of the sill panel being formed respectively with shaped features having an outer panel offset outward of the metallic vehicle body and connecting panels extending toward the metallic vehicle body for defining U-shaped cross sections on said fastening flange, each of the shaped features having one of the vertically oriented and upwardly open slots formed therein, one of the fastening devices being on each longitudinal side of each of the shaped features.

9. The elongated sill panel of claim 8, wherein the slots are substantially perpendicular to the free upper edge of the fastening flange.

10. The elongated sill panel of claim 8, wherein said slots are uniformly spaced with respect to one another.

11. A motor vehicle, comprising:
a metallic vehicle body with front and rear wheel cutouts spaced apart along a traveling direction of the motor vehicle; and
a sill panel formed from plastic and extending between the front and rear wheel cutouts, the sill panel including:
an elongated arched lower portion extending in the traveling direction between the front and rear wheel cutouts of the motor vehicle;
an elongated fastening flange projecting up from an upper side of the arched lower portion and joined continuously to the arched lower portion along the traveling direction between the front and rear wheel cutouts, the fastening flange further having a free upper edge on a longitudinal side of the fastening flange opposite the arched lower portion;

a plurality fastening devices provided on the fastening flange at positions spaced apart along the traveling direction of the motor vehicle for fastening the sill panel to the metallic vehicle body of the motor vehicle;

slots disposed between the fastening devices and extending from the free upper edge of the fastening flange to positions in proximity to the arched lower portion of the elongated sill panel, each of the slots being substantially adjacent one of the fastening devices and farther from all of the other fastening devices, the slots being dimensioned and disposed to compensate for temperature related dimensional changes and corresponding stresses that could cause visible deformation of the sill panel opposite longitudinal ends of the sill panel being formed respectively with shaped features having an outer panel offset outward of the metallic vehicle body and connecting panels extending toward the metallic vehicle body for defining U-shaped cross sections on said fastening flange, each of the shaped features having one of the vertically oriented and upwardly open slots formed therein, one of the fastening devices being on each longitudinal side of each of the shaped features.

12. The motor vehicle of claim 11, wherein the slots are substantially perpendicular to the free upper edge of the fastening flange.

13. The motor vehicle of claim 11, wherein the slots are uniformly spaced with respect to one another.

* * * * *